United States Patent
Ishida et al.

(10) Patent No.: US 10,854,893 B2
(45) Date of Patent: Dec. 1, 2020

(54) FUEL CELL

(71) Applicant: HONDA MOTOR CO., LTD., Tokyo (JP)

(72) Inventors: Kentaro Ishida, Wako (JP); Masahiro Matsutani, Wako (JP); Satoshi Oyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

(21) Appl. No.: 16/217,105

(22) Filed: Dec. 12, 2018

(65) Prior Publication Data
US 2019/0190038 A1  Jun. 20, 2019

(30) Foreign Application Priority Data

Dec. 14, 2017  (JP) ................................. 2017-239448

(51) Int. Cl.
| | | |
|---|---|---|
| *H01M 8/0273* | (2016.01) | |
| *H01M 8/0276* | (2016.01) | |
| *H01M 8/1004* | (2016.01) | |
| *H01M 8/0258* | (2016.01) | |
| *H01M 8/0284* | (2016.01) | |
| *H01M 8/1018* | (2016.01) | |

(52) U.S. Cl.
CPC ....... *H01M 8/0273* (2013.01); *H01M 8/0258* (2013.01); *H01M 8/0276* (2013.01); *H01M 8/0284* (2013.01); *H01M 8/1004* (2013.01); *H01M 2008/1095* (2013.01); *H01M 2250/20* (2013.01)

(58) Field of Classification Search
CPC .......................... H01M 8/1004; H01M 8/0273
See application file for complete search history.

(56) References Cited

U.S. PATENT DOCUMENTS

| | | | |
|---|---|---|---|
| 8,399,150 B2 | 3/2013 | Miller et al. | |
| 2008/0166622 A1 | 7/2008 | Shizuku et al. | |
| 2017/0263952 A1* | 9/2017 | Terada | ................ H01M 8/0273 |

FOREIGN PATENT DOCUMENTS

JP     2008-171615     7/2008

OTHER PUBLICATIONS

Japanese Office Action for Japanese Patent Application No. 2017-239448 dated Jul. 30, 2019.

* cited by examiner

*Primary Examiner* — Olatunji A Godo
(74) *Attorney, Agent, or Firm* — Amin, Turocy & Watson, LLP

(57) ABSTRACT

A power generation cell or a fuel cell includes an MEA, a first separator, and a second separator. A frame member is provided on an outer peripheral portion of the MEA. The frame member includes a frame member inner peripheral portion and a frame member outer peripheral portion held between the first separator and the second separator. The central position of a power generation area of the MEA in the thickness direction and the central position of the frame member outer peripheral portion in the thickness direction are offset from each other. Further, a first seal line of the first separator and a second seal line of the second separator, sealing the frame member outer peripheral portion, are non-symmetrical with each other.

7 Claims, 4 Drawing Sheets

FUEL CELL

CROSS-REFERENCE TO RELATED APPLICATION

This application is based upon and claims the benefit of priority from Japanese Patent Application No. 2017-239448 filed on Dec. 14, 2017, the contents of which are incorporated herein by reference.

BACKGROUND OF THE INVENTION

Field of the Invention

The present invention relates to a fuel cell including a frame member provided in an outer peripheral portion of a membrane electrode assembly.

Description of the Related Art

A fuel cell (unit power generation cell: hereinafter also referred to as the power generation cell) includes a membrane electrode assembly (MEA) and a pair of separators sandwiching the membrane electrode assembly. The membrane electrode assembly is formed by stacking an anode, a solid polymer electrolyte membrane, and a cathode together. In the stacked state, a fuel gas flow field is provided between the anode and the separator, and a fuel gas is supplied into the fuel gas flow field. Further, an oxygen-containing gas flow field is provided between the cathode and the separator, and an oxygen-containing gas is supplied to the oxygen-containing gas flow field. In use, for example, a predetermined number of power generation cells are stacked together to form an in-vehicle fuel cell stack.

Further, in recent years, as disclosed in U.S. Pat. No. 8,399,150, in some cases, the membrane electrode assembly is in the form of a frame equipped MEA including a frame member (sub-gasket) in an outer peripheral portion of the MEA. In the fuel cell disclosed in U.S. Pat. No. 8,399,150, the frame member and a pair of separators are stacked together in a non-contact manner. However, in general, an inner peripheral portion of the frame member is joined to the MEA, and an outer peripheral portion of the frame member is held between ridge shaped seals provided for the pair of separators. In the structure, the frame member reduces the quantity of expensive material used for the solid polymer electrolyte membrane, and protects the solid polymer electrolyte membrane in the form of a thin membrane having low strength.

SUMMARY OF THE INVENTION

The frame equipped MEA needs to have structure where the pair of separators apply uniform pressure to the frame equipped MEA from both sides of the outer peripheral portion of the frame member for sealing the frame equipped MEA, and the MEA and the pair of the separators contact each other at a suitable contact pressure.

The present invention has been made taking the above circumstances into account, and an object of the present invention is to provide a fuel cell having simple structure in which separators apply uniform pressure from both sides of a frame member to improve sealing performance, and the contact resistance between a membrane electrode assembly and separators is reduced to improve durability and power generation performance.

In order to achieve the above object, the present invention provides a fuel cell including: a membrane electrode assembly, the membrane electrode assembly including an electrolyte membrane, and a first electrode and a second electrode provided on both surfaces of the electrolyte membrane, respectively; a first separator stacked on the first electrode of the membrane electrode assembly; and a second separator stacked on the second electrode of the membrane electrode assembly, a first flow field being formed between the first separator and the first electrode, a first reactant gas being supplied to the first flow field, a second flow field being formed between the second separator and the second electrode, a second reactant gas being supplied to the second flow field, wherein a frame member is provided on an outer peripheral portion of the membrane electrode assembly, around the outer peripheral portion, the frame member includes a frame member inner peripheral portion joined to the membrane electrode assembly, and a frame member outer peripheral portion which is continuous with outside of the frame member inner peripheral portion and thicker than the frame member inner peripheral portion, and held between the first separator and the second separator, a central position of the membrane electrode assembly in a thickness direction and a central position of the frame member outer peripheral portion in a thickness direction are offset from each other, and a first seal configured to seal the frame member outer peripheral portion of the first separator and a second seal configured to seal the frame member outer peripheral portion of the second separator are non-symmetrical with each other.

Further, preferably, in a cross sectional side view, each of the first seal and the second seal may include a pair of inclined portions inclined from a flat bottom toward the frame member outer peripheral portion, and getting closer to each other, and a seal flat portion bridging the pair of inclined portions, and configured to seal the frame member outer peripheral portion.

Additionally, the first seal and the second seal may have different heights to the frame member outer peripheral portion, and an inclination angle of the pair of inclined portions inclined from the seal flat portion of the first or second seal having a smaller height may be larger than an inclination angle of the pair of the inclined portions inclined from the seal flat portion of the first or second seal having a larger height.

Further, the first seal and the second seal may have different heights to the frame member outer peripheral portion, and a radius of curvature of a coupling portion between the inclined portion and the bottom of the first or second seal having the smaller height may be larger than a radius of curvature of a coupling portion between the inclined portion and the bottom of the first or second seal having the larger height.

Moreover, a width of the seal flat portion of the first seal and a width of the seal flat portion of the second seal may be same.

In addition to the above structure, a width of the bottom of the first seal and a width of the bottom of the second seal may be same.

Further, preferably, a height of the first flow field formed by the first separator, for the membrane electrode assembly, and a height of the second flow field formed by the second separator, for the membrane electrode assembly, may be same.

Further, the first seal and the second seal may be made of elastic rubber material.

In this case, the rubber material of the first seal and the rubber material of the second seal may have properties or cross sectional shapes that are different from each other.

Further, preferably, an elastic modulus of the first seal and an elastic modulus of the second seal may be same.

In the fuel cell of the present invention, the central position of the membrane electrode assembly in the thickness direction and the central position of the frame member outer peripheral portion in the thickness direction may be offset from each other, and the first seal and the second seal are non-symmetrical with each other. In the structure, it is possible seal each of the separators and the frame member suitably. That is, in the fuel cell, uniform pressure is applied by the separators from both sides of the frame member to improve sealing performance, and it is possible to suppress leakage of the reactant gases. Further, in the fuel cell, it is possible to reduce contact resistance between the membrane electrode assembly and each of the separators, and greatly improve durability and power generation performance.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of the present invention will be described in detail with reference to the accompanying drawings.

First Embodiment

Figure 1:
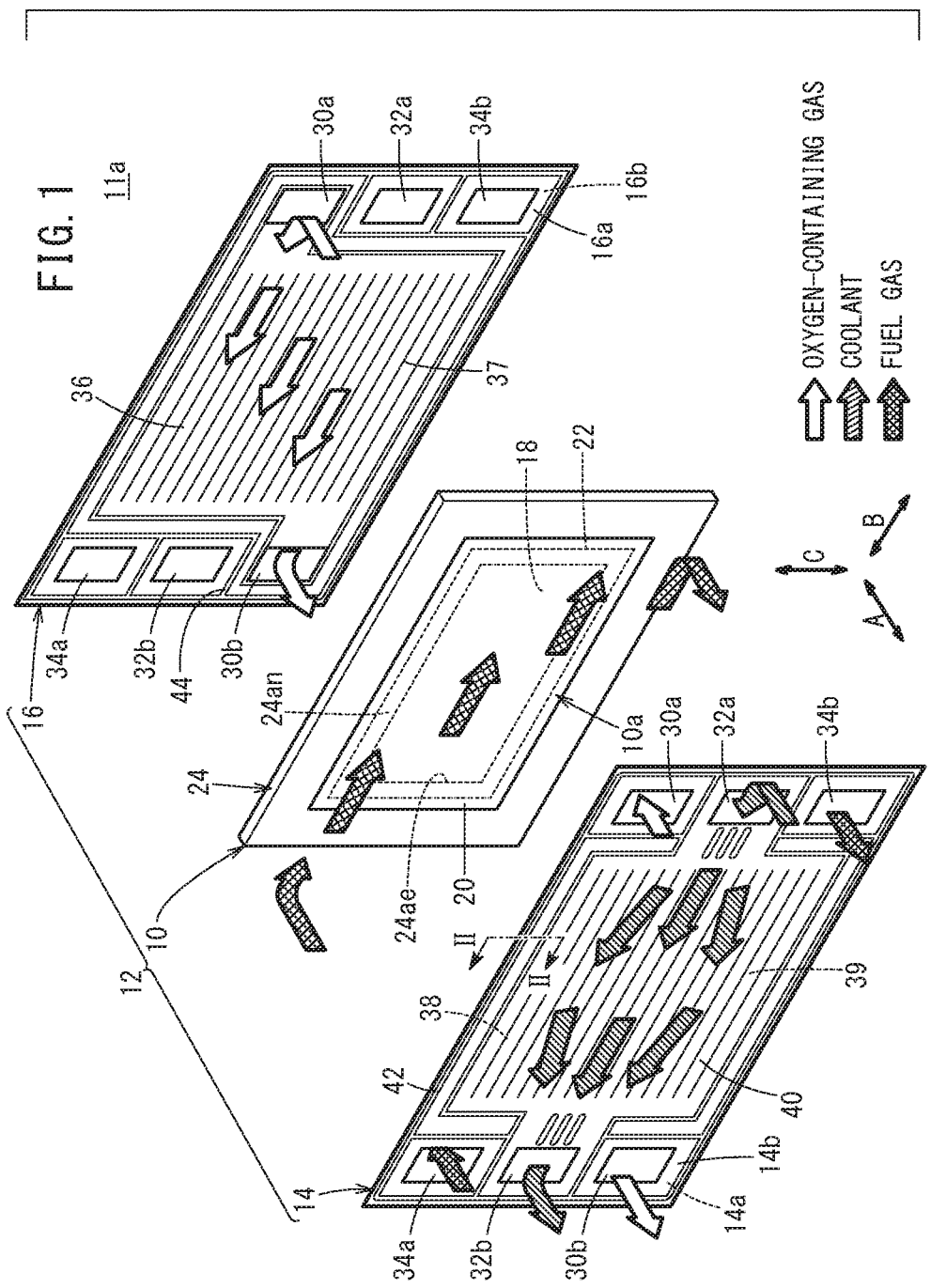
FIG. 1 is an exploded perspective view showing main components of a power generation cell according to a first embodiment of the present invention.

As shown in FIG. 1, a power generation cell (fuel cell) 12 according to a first embodiment includes a frame equipped membrane electrode assembly 10 (hereinafter referred to as the frame equipped MEA 10), and a first separator 14 and a second separator 16 provided on both surfaces of the frame equipped MEA 10, respectively. For example, the power generation cell 12 is a rectangular solid polymer electrolyte fuel cell elongated in a lateral (or longitudinal) direction. A plurality of the power generation cells 12 are stacked together in the horizontal direction indicated by the arrow A to form a fuel cell stack 11a. The power generation cells 12 may be stacked together in the direction of gravity. For example, the fuel cell stack 11a is mounted as an in-vehicle fuel cell stack, in a fuel cell electric automobile (not shown).

The frame equipped MEA 10 includes a membrane electrode assembly 10a (hereinafter referred to as the "MEA 10a"). The MEA 10a includes an electrolyte membrane 18, and an anode (first electrode) 20 and a cathode 22 (second electrode) provided on both sides of the electrolyte membrane 18, respectively.

Further, the power generation cell 12 is formed by sandwiching the frame equipped MEA 10 between the first separator 14 and the second separator 16. Each of the first separator 14 and the second separator 16 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. Alternatively, each of the first separator 14 and the second separator 16 is formed by molding or machining a carbon member.

At one end of the power generation cell 12 in a longitudinal direction indicated by an arrow B (horizontal direction), an oxygen-containing gas supply passage 30a, a coolant supply passage 32a, and a fuel gas discharge passage 34b are provided. The oxygen-containing gas supply passage 30a, the coolant supply passage 32a, and the fuel gas discharge passage 34b extend through the power generation cell 12 in the stacking direction indicated by the arrow A. An oxygen-containing gas (second reactant gas) such as air is supplied through the oxygen-containing gas supply passage 30a. Coolant such as pure water, ethylene glycol, oil is supplied to the coolant supply passage 32a. A fuel gas (first reactant gas) such as a hydrogen-containing gas is discharged through the fuel gas discharge passage 34b. The oxygen-containing gas supply passage 30a, the coolant supply passage 32a, and the fuel gas discharge passage 34b are arranged in the vertical direction indicated by the arrow C.

At the other end of the power generation cell 12 in the longitudinal direction indicated by the arrow B, a fuel gas supply passage 34a for supplying the fuel gas, a coolant discharge passage 32b for discharging the coolant, and an oxygen-containing gas discharge passage 30b for discharging the oxygen-containing gas are provided. The fuel gas supply passage 34a, the coolant discharge passage 32b, and the oxygen-containing gas discharge passage 30b extend through the power generation cell 12 in the direction indicated by the arrow A. The fuel gas supply passage 34a, the coolant discharge passage 32b, and the oxygen-containing gas discharge passage 30b are arranged in the direction indicated by the arrow C.

The first separator 14 has a fuel gas flow field (first flow field) 38 on its surface 14a facing the frame equipped MEA 10. The fuel gas flow field 38 is connected to the fuel gas supply passage 34a and the fuel gas discharge passage 34b (see also FIG. 2). Specifically, the fuel gas flow field 38 is formed between the first separator 14 and the anode 20. The fuel gas flow field 38 includes a plurality of straight flow grooves (or wavy flow grooves) extending in the direction indicated by the arrow B.

The second separator 16 has an oxygen-containing gas flow field 36 (second flow field) on its surface 16a facing the frame equipped MEA 10. The oxygen-containing gas flow field 36 is connected to the oxygen-containing gas supply passage 30a and the oxygen-containing gas discharge passage 30b (see also FIG. 2). Specifically, the oxygen-containing gas flow field 36 is formed between the second separator 16 and the cathode 22. The oxygen-containing gas flow field 36 includes a plurality of straight flow grooves (or wavy flow grooves) extending in the direction indicated by the arrow B.

Further, when the plurality of power generation cells 12 are stacked together, a coolant flow field 40 is formed between a surface 14b of the first separator 14 and a surface 16b of the second separator 16 that are adjacent to each other. The coolant flow field 40 is connected to the coolant supply passage 32a and the coolant discharge passage 32b. The coolant flow field 40 extends in the direction indicated by the arrow B.

Figure 2:
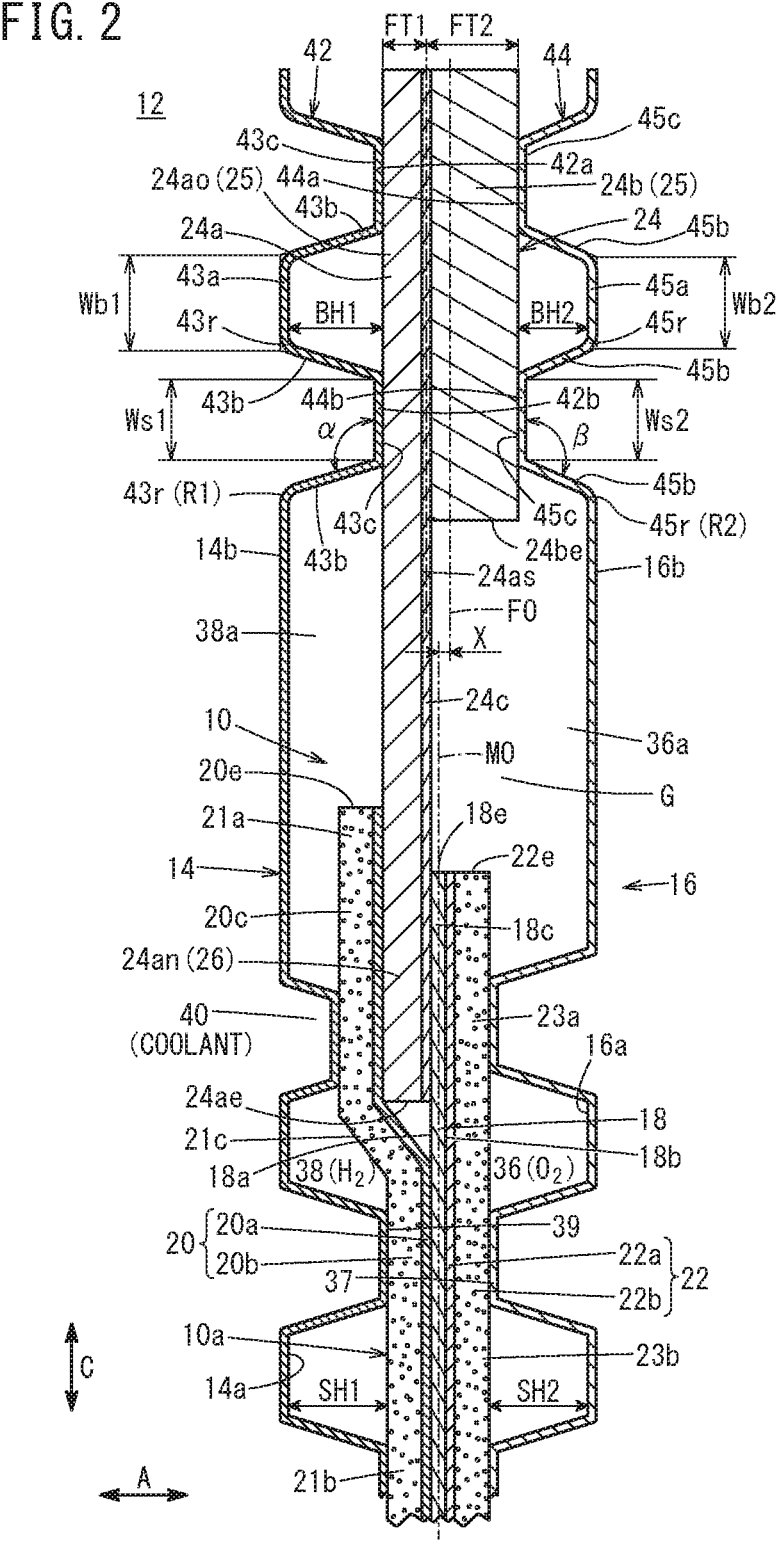
FIG. 2 is a cross sectional view taken along a line II-II in FIG. 1.

As shown in FIG. 2, a plurality of ridges 39 forming the fuel gas flow field 38 are provided on the surface 14a of the first separator 14 (facing the frame equipped MEA 10). The ridges 39 are expanded toward the anode 20, and contact the anode 20. A plurality of ridges 37 forming the oxygen-containing gas flow field 36 are provided on the surface 16a of the second separator 16 (facing the frame equipped MEA 10). The ridges 37 are expanded toward the cathode 22, and contact the cathode 22. That is, the ridges 37 and the ridges 39 face each other, and the power generation area (active area) of the MEA 10a is sandwiched between the ridges 37 and the ridges 39.

Further, in the embodiment of the present invention, the height SH1 of the ridges 39 of the first separator 14 and the height SH2 of the ridges 37 of the second separator 16 are the same. Further, flat portions of the ridges 37, 39 of the first and second separators 14, 16 (portions which contact the anode 20 and the cathode 22, and portions where the first and second separators 14, 16 contact each other) have the same width. In the structure, the channel cross sectional area of the fuel gas flow field 38 formed by the first separator 14 and the channel cross sectional area of the oxygen-containing gas flow field 36 formed by the second separator 16 are the same.

For example, the electrolyte membrane 18 of the MEA 10a is a solid polymer electrolyte membrane (cation ion exchange membrane). For example, it is preferable for the solid polymer electrolyte membrane to be a thin membrane of perfluorosulfonic acid containing water. A fluorine based electrolyte may be used as the electrolyte membrane 18. Alternatively, an HC (hydrocarbon) based electrolyte may be used as the electrolyte membrane 18.

The anode 20 includes a first electrode catalyst layer 20a joined to one surface 18a of the electrolyte membrane 18, and a first gas diffusion layer 20b stacked on the first electrode catalyst layer 20a. The first electrode catalyst layer 20a and the first gas diffusion layer 20b have the same surface size (outer size), and the surface size of the first electrode catalyst layer 20a and the first gas diffusion layer 20b is larger than the surface sizes of the electrolyte membrane 18 and the cathode 22.

The cathode 22 includes a second electrode catalyst layer 22a joined to a surface 18b of the electrolyte membrane 18, and a second gas diffusion layer 22b stacked on the second electrode catalyst layer 22a. The second electrode catalyst layer 22a and the second gas diffusion layer 22b have the same surface size (outer size) which is also the same as the surface size of the electrolyte membrane 18. Thus, in the surface direction of the electrolyte membrane 18 (in the direction indicated by the arrow C in FIG. 2), an outer end 22e of the cathode 22 and an outer end 18e of the electrolyte membrane 18 are at the same position.

The outer end 22e of the cathode 22 and the outer end 18e of the electrolyte membrane 18 are positioned inside an outer end 20e of the anode 20 over the entire periphery. It should be noted that the surface size of the cathode 22 may be larger than the surface size of the anode 20 and the outer end 22e of the cathode 22 may be positioned outside the outer end 20e of the anode 20 over the entire periphery (see also FIG. 4). Alternatively, the anode 20 and the cathode 22 may have the same surface size, and the outer end 20e of the anode 20 and the outer end 22e of the cathode 22 may be provided at the same position in the surface direction of the electrolyte membrane 18 (in the direction indicated by the arrow C in FIG. 2).

For example, the first electrode catalyst layer 20a is formed by porous carbon particles deposited uniformly on the surface of the first gas diffusion layer 20b together with an ion conductive polymer binder and platinum alloy supported on the porous carbon particles. For example, the second electrode catalyst layer 22a is formed by porous carbon particles deposited uniformly on the surface of the second gas diffusion layer 22b together with an ion conductive polymer binder and platinum alloy supported on the porous carbon particles. The thickness of the first electrode catalyst layer 20a and the thickness of the second electrode catalyst layer 22a are the same. The surface size of the second electrode catalyst layer 22a is smaller than the surface size of the first electrode catalyst layer 20a.

The first gas diffusion layer 20b and the second gas diffusion layer 22b are made of carbon paper or carbon cloth, etc. The thickness of the first gas diffusion layer 20b and the thickness of the second gas diffusion layer 22b are the same. The surface size of the second gas diffusion layer 22b is smaller than the surface size of the first gas diffusion layer 20b. Therefore, a central position MO of the power generation area (active area) of the MEA 10a in the thickness direction matches the central position of the electrolyte membrane 18 in the thickness direction. The thickness of the first electrode catalyst layer 20a may be smaller than the thickness of the second electrode catalyst layer 22a. Further, an electrically conductive porous layer may be interposed between the first electrode catalyst layer 20a and the first gas diffusion layer 20b, and between the second electrode catalyst layer 22a and the second gas diffusion layer 22b.

As shown in FIGS. 1 and 2, the frame equipped MEA 10 further includes a frame member (sub-gasket) 24. The frame member 24 is provided around the outer end of the electrolyte membrane 18, and joined to the anode 20 and the electrolyte membrane 18. The frame member 24 includes two frame shaped sheets having different thicknesses, in a frame member outer peripheral portion 25. Specifically, the frame member 24 includes a first frame shaped sheet 24a and a second frame shaped sheet 24b. The first frame shaped sheet 24a extends inward from the frame member outer peripheral portion 25 of the frame member 24, and is joined to the outer peripheral portion of the MEA 10a. The second frame shaped sheet 24b is joined to the outer peripheral portion 24ao of the first frame shaped sheet 24a. The first frame shaped sheet 24a and the second frame shaped sheet 24b are joined together in the thickness direction by an adhesive layer 24c made of adhesive. Therefore, the frame member outer peripheral portion 25 of the frame member 24 is thicker than a frame member inner peripheral portion 26 of the frame member 24.

The thickness of the first frame shaped sheet 24a is smaller than the thickness of the second frame shaped sheet 24b. An inner peripheral portion 24an of the first frame shaped sheet 24a extends inward from an outer peripheral portion 24ao joined to the second frame shaped sheet 24b, and forms the frame member inner peripheral portion 26 provided inside the MEA 10a, and joined to the MEA 10a.

Specifically, the inner peripheral portion 24an of the first frame shaped sheet 24a is held between an outer peripheral portion 18c of the electrolyte membrane 18 and an outer peripheral portion 20c of the anode 20. The inner peripheral portion 24an of the first frame shaped sheet 24a and the outer peripheral portion 18c of the electrolyte membrane 18 are joined together though the adhesive layer 24c.

In the structure, a step is formed in the anode 20, at a position corresponding to an inner end 24ae of the first frame shaped sheet 24a. That is, the anode 20 includes an inclined area 21c between an area 21a overlapped with the inner peripheral portion 24an of the first frame shaped sheet 24a and an area 21b overlapped with the electrolyte membrane 18. The first electrode catalyst layer 20a and the first gas diffusion layer 20b in the inclined area 21c are inclined from the electrolyte membrane 18.

In the anode 20, a surface of the area 21a overlapped with the inner peripheral portion 24an of the first frame shaped sheet 24a, adjacent to the first separator 14 is spaced from the electrolyte membrane 18, in comparison with a surface of the area 21b overlapped with the electrolyte membrane 18, adjacent to the first separator 14.

In contrast, the cathode 22 has a flat shape from an area 23b overlapped with the electrolyte membrane 18 to an area 23a overlapped with the inner peripheral portion 24an of the first frame shaped sheet 24a. Therefore, the second electrode catalyst layer 22a and the second gas diffusion layer 22b are in parallel to the electrolyte membrane 18 from the area 23b overlapped with the electrolyte membrane 18 to the area 23a overlapped with the inner peripheral portion 24an of the first frame shaped sheet 24a. It should be noted that the cathode 22 may include an inclined area corresponding to the inclined area 21c of the anode 20.

A thickness FT1 of the outer peripheral portion 24ao of the first frame shaped sheet 24a (thickness from the center of the adhesive layer 24c to the outside of the first frame shaped sheet 24a) and a thickness FT2 of the second frame shaped sheet 24b (thickness from the center of the adhesive layer 24c to the outside of the second frame shaped sheet 24b) have the relationship of FT1<FT2. Therefore, the frame member outer peripheral portion 25 of the frame member 24 is sufficiently thicker than the frame member inner peripheral portion 26. A central position FO in the thickness direction of the frame member outer peripheral portion 25 is positioned inside the second frame shaped sheet 24b.

In this regard, the central position FO of the frame member outer peripheral portion 25 of the frame member 24 and the central position MO of the power generation area of the MEA 10a in the thickness direction are shifted (offset) from each other in a cross sectional side view. Specifically, the central position FO of the frame member 24 in the thickness direction is shifted from the central position MO of the MEA 10a in the thickness direction toward the second separator 16. Stated otherwise, the frame equipped MEA 10 is sandwiched between the separators 14, 16 in a manner that the position and the thickness of the frame member outer peripheral portion 25 of the frame member 24 and the position and thickness of the active area of the MEA 10a are shifted (different) from each other. A shift amount X between the central position FO of the frame member 24 in the thickness direction and the central position MO of the power generation area the MEA 10a in the thickness direction can be designed in consideration of, e.g., the thickness of the power generation cell 12 including the MEA 10a and the frame member outer peripheral portion 25 and the thickness of each of the separators 14, 16.

An inner end 24be of the second frame shaped sheet 24b is positioned outside the inner end 24ae of the first frame shaped sheet 24a (in a direction away from the MEA 10a), and positioned outside the outer end 20e of the anode 20 and the outer end 22e of the cathode 22. A gap G is formed between the inner end 24be of the second frame shaped sheet 24b and the outer end 22e of the cathode 22. The gap G forms a part of a channel 36a described later.

The first frame shaped sheet 24a and the second frame shaped sheet 24b are made of resin material. Examples of materials used for the first frame shaped sheet 24a and the second frame shaped sheet 24b include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The adhesive layer 24c is provided over an entire surface 24as of the first frame shaped sheet 24a closer to the second frame shaped sheet 24b (closer to the cathode). At the gap G as described above, the first frame shaped sheet 24a is exposed to the gap G (channel 36a) through the adhesive layer 24c. As the adhesive of the adhesive layer 24c, for example, liquid adhesive or a hot melt sheet is provided. The adhesive is not limited to liquid or solid adhesive, and not limited to thermoplastic or thermosetting adhesive, etc.

A first seal line 42 (metal bead seal: first seal) is provided on the surface 14a of the first separator 14, along the outer peripheral portion of the first separator 14. The first seal line 42 is formed integrally with the first separator 14, and expanded toward the frame member 24. The first seal line 42 is deformed elastically, and contacts the outer peripheral portion 24ao of the first frame shaped sheet 24a (area overlapped with the second frame shaped sheet 24b) in an air-tight and liquid-tight manner. The first seal line 42 includes an outer bead 42a and an inner bead 42b provided inside the outer bead 42a. It should be noted that the first seal line 42 may include only one of the outer bead 42a and the inner bead 42b. Further, resin material may be coated to an area between the first seal line 42 and the first frame shaped sheet 24a.

The inner bead 42b is provided around the fuel gas flow field 38, the fuel gas supply passage 34a, and the fuel gas discharge passage 34b, and allows the fuel gas flow field 38 to be connected to the fuel gas supply passage 34a and the fuel gas discharge passage 34b. A channel 38a is provided inside the first seal line 42 (on a side closer to the MEA 10a), and formed between the first separator 14 and the frame member 24. The channel 38a is connected to the fuel gas flow field 38, and the fuel gas is supplied to the channel 38a.

A second seal line 44 (metal bead seal: second seal) is provided on the surface 16a of the second separator 16, along the outer peripheral portion of the second separator 16. The second seal line 44 is formed integrally with the second separator 16, and expanded toward the frame member 24. The second seal line 44 is deformed elastically, and contacts the second frame shaped sheet 24b in an air-tight and liquid-tight manner. The first seal line 42 and the second seal line 44 face each other through the frame member 24, and the frame member 24 is held between the first seal line 42 and the second seal line 44. The second seal line 44 also includes an outer bead 44a and an inner bead 44b provided inside the outer bead 44a. It should be noted that resin material may be coated to an area between the second seal line 44 and the second frame shaped sheet 24b.

The inner bead 44b is provided around the oxygen-containing gas flow field 36, the oxygen-containing gas supply passage 30a, and the oxygen-containing gas discharge passage 30b, and allows the oxygen-containing gas flow field 36 to be connected to the oxygen-containing gas supply passage 30a and the oxygen-containing gas discharge passage 30b. The channel 36a is provided inside the second seal line 44 (on a side closer to the MEA 10a), and formed between the second separator 16 and the frame member 24. The channel 36a is connected to the oxygen-containing gas flow field 36, and the oxygen-containing gas is supplied to the channel 36a. The first seal line 42 and the second seal line 44 may be made of elastic rubber material integrally with the separators 14, 16.

In this regard, a height BH1 of each of the beads 42a, 42b of the first seal line 42 and a height BH2 of each of the beads 44a, 44b of the second seal line 44 are determined to satisfy the relationship of: BH1>BH2. Further, the first seal line 42 and the second seal line 44 are configured have the same elastic modulus (spring constant). Therefore, each of the beads 42a, 42b and each of the beads 44a, 44b has a non-symmetrical shape (non-linear shape) with each other.

Specifically, in a cross sectional side view, the first separator 14 has a flat bottom 43a at a position spaced from the frame member 24. Each of the beads 42a, 42b of the first seal line 42 has a trapezoidal shape which is different from the ridges 39 of the fuel gas flow field 38 of the first separator 14, and protrudes from the bottom 43a.

Each of the beads 42a, 42b includes a pair of inclined portions 43b which is continuous with the bottom 43a and protrude toward the frame member outer peripheral portion 25, and a seal flat portion 43c bridging over the pair of inclined portions 43b and sealing the frame member outer peripheral portion 25. Further, each of coupling portions between the bottom 43a and the pair of inclined portions 43b has a rounded corner 43r having a predetermined radius of curvature R1.

In a cross sectional side view, the second separator 16 has a flat bottom 45a at a position spaced from the frame member 24. Each of the beads 44a, 44b of the second seal line 44 has a trapezoidal shape which is different from the ridges 37 of the oxygen-containing gas flow field 36 of the second separator 16, and protrudes from the bottom 45a.

Each of the beads 44a, 44b includes a pair of inclined portions 45b which are continuous with the bottom 45a and protrude toward the frame member outer peripheral portion 25, and a seal flat portion 45c bridging over the pair of inclined portions 45b and sealing the frame member outer peripheral portion 25. Further, each of coupling portions between the bottom 45a and the pair of inclined portions 45b has a rounded corner 45r having a predetermined radius of curvature R2.

A width Wb1 of the bottom 43a of the first seal line 42 and a width Wb2 of the bottom 45a of the second seal line 44 have the same size. Further, the width Ws1 of the seal flat portion 43c of each of the beads 42a, 42b of the first seal line 42 and the width Ws2 of the seal flat portion 45c of each of the beads 44a, 44b of the second seal line 44 have the same size.

Further, as described above, the height BH2 of each of the beads 44a, 44b of the second seal line 44 is smaller than the height BH1 of each of the beads 42a, 42b of the first seal line 42. In the structure, the inclination angle β of the pair of inclined portions 45b inclined from the seal flat portion 45c of each of the beads 44a, 44b is larger than the inclination angel α of the pair of inclined portions 43b of the seal flat portion 43c of each of the beads 42a, 42b. Further, the radius of curvature R2 of the pair of rounded corners 45r connecting the bottom 45a and the second seal line 44 is larger than the radius of curvature R1 of the pair of rounded corners 43r connecting the bottom 43a and the first seal line 42.

That is, since the second seal line 44 has a large inclination angel β, and the radius of curvature R2 of the rounded corner 45r is large, each of the beads 44a, 44b has the low elastic modulus which is the same as the elastic modulus of each of the beads 42a, 42b of the first seal line 42. Preferably, the first seal line 42 and the second seal line 44 at least have the same elastic modulus. Therefore, by adopting structure where the inclination angle α and the inclination angle β are different from each other, or the radius of curvature R1 and the radius of curvature R2 are different from each other, the elastic modulus of the first seal line 42 and the elastic modulus of the second seal line 44 can be the same. Specifically, the pair of inclined portions 43b, 45b may have the same inclination angle (α=β) and different radii of curvature R1, R2. In this case, the width Wb1 of the bottom 43a and the width Wb2 of the bottom 45a can have the relationship of: Wb1≠Wb2, or the width Ws1 of the seal flat portion 43c and the width Ws2 of the seal flat portion 45c can have the relationship of Ws1≠Ws2. Conversely, the pair of inclined portions 43b, 45b may have different inclination angles α, β and the same radius of curvature (R1=R2) (or structure which does not include rounded corners). Further, the pair of inclined portions 43b, 45b may adopt various shapes. For example, the rounded corners are also formed at the coupling portions between the pair of inclined portions 43b and the seal flat portion 43c, or the coupling portions between the pair of inclined portions 45b and the seal flat portion 45c.

Further, in the first separator 14, the bottom of each of the ridges 39 forming the fuel gas flow field 38 and the bottom 43a of each of the beads 42a, 42b of the first seal line 42 are in the same plane (have the same height). Likewise, in the second separator 16, the bottom of each of the ridges 37 forming the oxygen-containing gas flow field 36 and the bottom 45a of each of the beads 44a, 44b of the second seal line 44 are in the same plane (have the same height).

Figure 3:
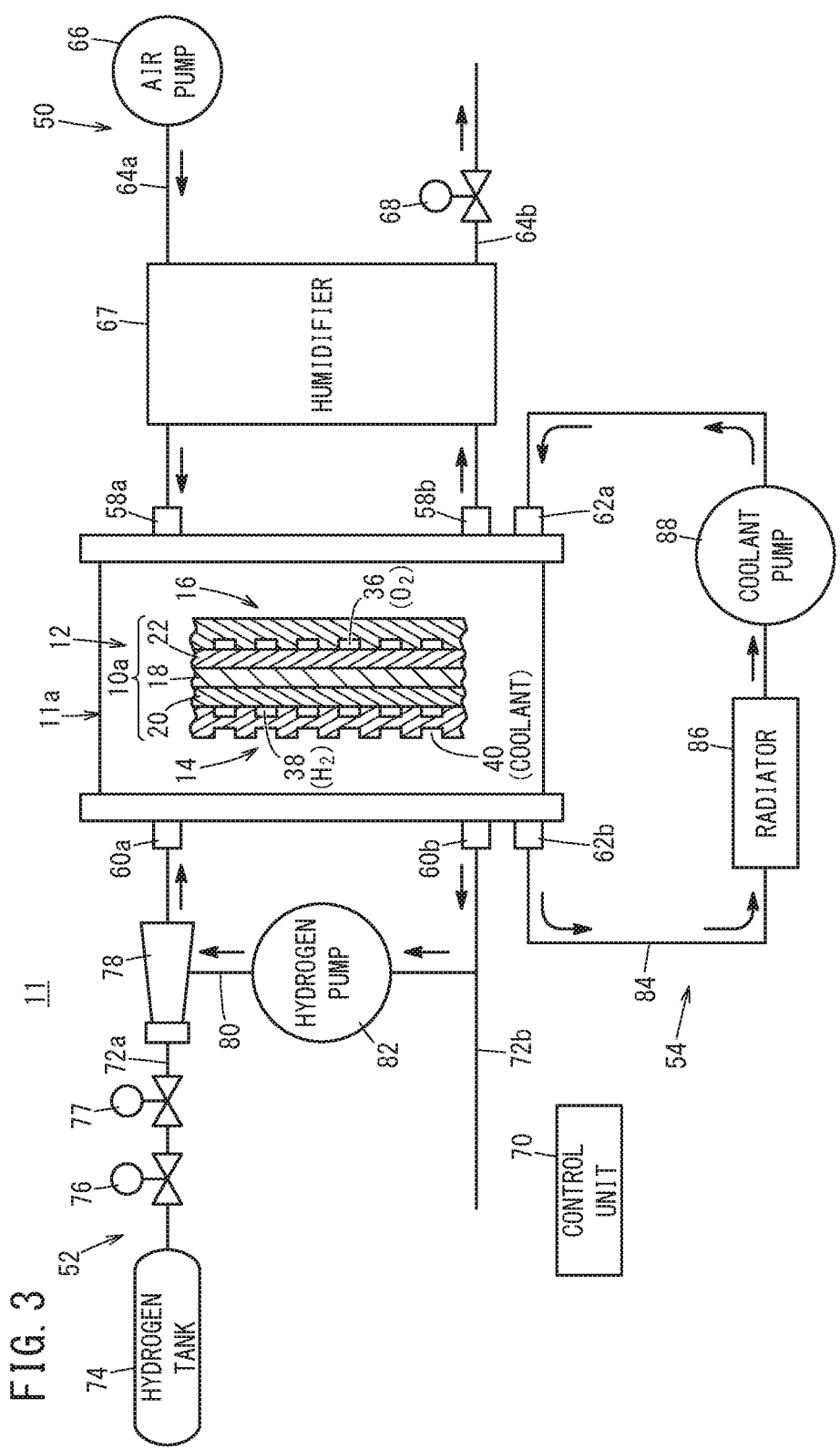
FIG. 3 is an overall diagram schematically showing a fuel cell system.

As shown in FIG. 3, a fuel cell system 11 includes the above fuel cell stack 11a, an oxygen-containing gas supply apparatus 50 for supplying the oxygen-containing gas to the fuel cell stack 11a, a fuel gas supply apparatus 52 for supplying the fuel gas to the fuel cell stack 11a, and a coolant supply apparatus 54 for supplying a coolant to the fuel cell stack 11a.

The oxygen-containing gas supply apparatus 50 includes an oxygen-containing gas supply pipe 64a connected to the oxygen-containing gas supply passage 30a (see FIG. 1) through an oxygen-containing gas supply manifold 58a provided for the fuel cell stack 11a, and an oxygen-containing gas discharge pipe 64b connected to the oxygen-containing gas discharge passage 30b (see FIG. 1) through an oxygen-containing gas discharge manifold 58b provided for the fuel cell stack 11a. An air pump 66 is provided for the oxygen-containing gas supply pipe 64a. A back pressure regulating valve 68 is provided in the oxygen-containing gas discharge pipe 64b.

A humidifier 67 for humidifying the air to be supplied is provided for the oxygen-containing gas supply pipe 64a and the oxygen-containing gas discharge pipe 64b. In the oxygen-containing gas supply pipe 64a, the air pump 66 is provided upstream of the humidifier 67. In the oxygen-containing gas discharge pipe 64b, the back pressure regulating valve 68 is provided downstream of the humidifier 67. A control unit 70 of the fuel cell system 11 controls at least one of the operation speed of the air pump 66 and the valve opening angle of the back pressure regulating valve 68 to control the pressure of the oxygen-containing gas flowing through the oxygen-containing gas flow field 36.

The fuel gas supply apparatus 52 includes a fuel gas supply pipe 72a connected to the fuel gas supply passage 34a (see FIG. 1) through a fuel gas supply manifold 60a provided for the fuel cell stack 11a, and a fuel gas discharge pipe 72b connected to the fuel gas discharge passage 34b (see FIG. 1) through a fuel gas discharge manifold 60b provided for the fuel cell stack 11a.

A hydrogen tank 74 for storing high pressure hydrogen is provided upstream of the fuel gas supply pipe 72a. In the fuel gas supply pipe 72a, a stop valve 76, a pressure regulating valve 77, and an ejector 78 are provided between the fuel gas supply manifold 60a and the hydrogen tank 74. A hydrogen circulation channel 80 is connected to the ejector 78 and the fuel gas discharge pipe 72b. A hydrogen pump 82 for hydrogen circulation is provided in the hydrogen circulation channel 80. The control unit 70 controls the speed of driving the hydrogen pump 82 to control the flow rate of the fuel gas flowing through the fuel gas flow field 38.

The coolant supply apparatus 54 includes a coolant circulation channel 84 for circulating, and supplying the coolant to the fuel cell stack 11a. The coolant circulation channel 84 is connected to the coolant supply passage 32a (see FIG. 1) through a coolant supply manifold 62a provided for the fuel cell stack 11a. The coolant circulation channel 84 is connected to the coolant discharge passage 32b (see FIG. 1) through a coolant discharge manifold 62b. A radiator 86 and a coolant pump 88 are provided for the coolant circulation channel 84. The control unit 70 controls the driving speed of the coolant pump 88 to control the flow rate of the coolant flowing through the coolant flow filed 40.

The power generation cell (fuel cell) 12 according to the embodiment of the present invention basically has the above structure. Hereinafter, production of the power generation cell 12, and operation of the fuel cell system 11 including this power generation cell 12 will be described below.

In producing the power generation cell 12, firstly, the frame equipped MEA 10 is produced by joining the electrolyte membrane 18 and the anode 20 together such that the frame member 24 is provided between the electrolyte membrane 18 and the anode 20. In this case, the adhesive layer 24c of the frame member 24 is adhered to the electrolyte membrane 18. Then, the first separator 14 is provided on one surface of the frame equipped MEA 10, and the second separator 16 is provided on the other surface of the frame equipped MEA 10. The frame equipped MEA 10 is sandwiched between the first separator 14 and the second separator 16 to form bead seal structure. Instead of the bead seals, seals of elastic rubber may be used. In this case, the seals have the same height.

In this regard, as described above, the central position MO of the power generation area of the MEA 10a in the width direction sandwiched between the separators 14, 16 and the central position FO in the width direction of the frame member outer peripheral portion 25 of the frame member 24 are offset from each other. In the power generation cell 12, the height BH2 of each of the beads 44a, 44b of the second seal line 44 of the second separator 16 is smaller than the height BH1 of each of the beads 42a, 42b of the first seal line 42 of the first separator 14 (BH1>BH2). Further, each of the beads 42a, 42b of the first seal line 42 and the each of the beads 44a, 44b of the second seal line 44 are non-symmetrical with each other to have the same elastic modulus.

Specifically, the inclination angle β of the pair of inclined portions 45b of each of the beads 44a, 44b of the second seal line 44 is larger than the inclination angle α of the pair of inclined portions 43b of each of the beads 42a, 42b of the first seal line 42. Further, the radius of curvature R2 of the pair of rounded corners 45r of the second seal line 44 is larger than the radius of curvature R1 of the pair of rounded corners 43r of the first seal line 42.

In the structure, the elastic modulus of each of the beads 44a, 44b of the second seal line 44 is decreased to become equal to the elastic modulus of each of the beads 42a, 42b of the first seal line 42. In the structure, at the time of sealing by the beads between the separators 14, 16, and the frame member 24, the frame member 24 is pressed from both sides suitably, and the separators 14, 16 and the frame member 24 can tightly contact each other. Therefore, even in the structure where the separators 14, 16 hold the frame member 24 which is offset from the MEA 10a, it is possible to apply the same contract pressure from the beads 42a, 42b of the first seal line 42 and the beads 44a, 44b of the second seal line 44 to the frame member 24 to exert the desired sealing function. Further, each of the separators 14, 16 can apply the contact pressure of the same level to the anode 20 and the cathode 22 over their surfaces, and it becomes possible to suitably achieve uniform pressure of the stack structure.

The fuel cell system 11 includes the fuel cell stack 11a formed by stacking a plurality of the power generation cells 12. As shown in FIG. 3, in the oxygen-containing gas supply apparatus 50, air is supplied to the oxygen-containing gas supply pipe 64a under operation of the air pump 66. After the air is humidified through the humidifier 67, the air is supplied to the oxygen-containing gas supply passage 30a (see FIG. 1) through the oxygen-containing gas supply manifold 58a. The humidifier 67 adds the water and the heat discharged from the oxygen-containing gas discharge manifold 58b to the air to be supplied.

In the meanwhile, in the fuel gas supply apparatus 52, under opening operation of the stop valve 76, the fuel gas is supplied from the hydrogen tank 74 to the fuel gas supply pipe 72a. At this time, the fuel gas is supplied to the fuel gas supply passage 34a (see FIG. 1) through the fuel gas supply manifold 60a.

Further, in the coolant supply apparatus 54, under operation of the coolant pump 88, the coolant is supplied from the coolant circulation channel 84 to the coolant supply passage 32a (see FIG. 1).

Therefore, as shown in FIG. 1, the oxygen-containing gas is supplied to the oxygen-containing gas supply passage 30a, the fuel gas is supplied to the fuel gas supply passage 34a, and the coolant is supplied to the coolant supply passage 32a.

The oxygen-containing gas flows from the oxygen-containing gas supply passage 30a to the oxygen-containing gas flow field 36 of the second separator 16, and moves in the direction indicated by the arrow B, and the oxygen-containing gas is supplied to the cathode 22 of the MEA 10a. In the meanwhile, the fuel gas flows from the fuel gas supply passage 34a to the fuel gas flow field 38 of the first separator 14. The fuel gas moves along the fuel gas flow field 38 in the direction indicated by the arrow B, and the fuel gas is supplied to the anode 20 of the MEA 10a.

Thus, in the MEA 10a, the oxygen-containing gas supplied to the cathode 22, and the fuel gas supplied to the anode 20 are partially consumed in the second electrode catalyst layer 22a and the first electrode catalyst layer 20a by electrochemical reactions to generate electrical energy. The oxygen-containing gas partially consumed in the power generation is discharged in the direction indicated by the arrow A along the oxygen-containing gas discharge passage 30b. Likewise, the fuel gas partially consumed in power generation is discharged in the direction indicated by the arrow A along the fuel gas discharge passage 34b. Further, the coolant supplied to the coolant supply passage 32a flows into the coolant flow field 40 between the first separator 14 and the second separator 16. After the coolant cools the MEA 10a, the coolant is discharged through the coolant discharge passage 32b.

As described above, in the power generation cell (fuel cell) 12, the central position MO of the power generation area of the MEA 10a in the thickness direction and the central position FO of the frame member outer peripheral portion 25 are offset from each other, and the first seal line 42 and the second seal line 44 are non-symmetrical with each other. That is, in the power generation cells 12, the separators 14, 16 apply uniform pressure from both sides of the frame member 24. In the structure, improvement in the sealing performance is achieved, and it is possible to suppress leakage of the reactant gases. Further, in the power generation cell 12, it is possible to reduce the contact resistance between the each of the separators 14, 16 and the MEA 10a, and greatly improve the durability and the power generation performance.

Further, the first and second seal lines 42, 44 include the bottoms 43a, 45a, the pair of inclined portions 43b, 45b, and the seal flat portions 43c, 45c. Therefore, in the power generation cell 12, the seal flat portions 43c, 45c and the frame member outer peripheral portion 25 contact each other reliably, and it is possible to uniformly apply the contact pressure from each of the beads 42a, 42b of the first seal line 42 and from each of the beads 44a, 44b of the second seal line 44.

In particular, since the elastic modulus of the first seal line 42 and the elastic modulus of the second seal line 44 are the same, the same contact pressure is applied to the frame member 24 from the first seal line 42 and the second seal line 44 on both sides. Therefore, in the power generation cell 12, the sealing performance between each of the separators 14, 16 and the frame member 24 is improved, and thus, further improvement in the durability and the power generation performance is achieved.

The inclination angle β of the inclined portion 45b of the second seal line 44 having the smaller height is larger than the inclination angle α of the inclined portion 43b of the first seal line 42 having the larger height. In the structure, it is possible to reduce the elastic modulus of the second seal line 44. That is, though the seal having the small height has the elastic modulus higher than that of the seal having the larger height, by reducing the elastic modulus having the smaller height, it becomes possible to achieve the structure where each of the seals has the elastic modulus at the same level. In this manner, at the time of sealing by the beads, it is possible to suitably join the first and second seal lines 42, 44 and the frame member outer peripheral portion 25 more suitably.

The radius of curvature R2 of the rounded corner 45r of the coupling portion of the second seal line 44 having the small height is larger than the radius of curvature R1 of the rounded corner 43r of the coupling portion of the first seal line 42 having the large height. In this manner, it is possible to lower the elastic modulus of the second seal line 44. That is, also in the case where the radius of curvature R1 and the radius of curvature R2 are different, the elastic modulus of the seal having the smaller height can be lowered to become equal to the elastic modulus of the seal having the larger height.

Moreover, in the power generation cell 12, in the case where the first seal line 42 and the second seal line 44 satisfy the relationships of the inclination angle and the radius of curvature: α<β and R1<R2, it is possible to widen the adjustment range of the elastic modulus, and improve the freedom in deign. Further, at the time of sealing by the beads, it is possible to join the first and second seal lines 42, 44, and the frame member outer peripheral portion 25 more suitably.

Further, in the power generation cell 12, the width Ws1 of the seal flat portion 43c of the first seal line 42 and the width Ws2 of the seal flat portion 45c of the second seal line 44 are the same. Therefore, it is possible to simply achieve the structure where the first and second seal lines 42, 44 are in surface to surface contact with, and pressed against the contact portions of the frame member outer peripheral portion 25. Thus, it is possible to apply the uniform contact pressure from each of the beads 42a, 42b of the first seal line 42 and the each of the beads 44a, 44b of the second seal line 44.

Further, in the power generation cell 12, the height of the fuel gas flow field 38 formed by the first separator 14 and the height of the oxygen-containing gas flow field 36 formed by the second separator 16 are the same. In the structure, it is possible to sufficiently reduce the contact resistance between the MEA 10a and each of the separators 14, 16. As a result, it becomes possible to increase the durability of the power generation cell 12 to a greater extent.

Second Embodiment

Figure 4:
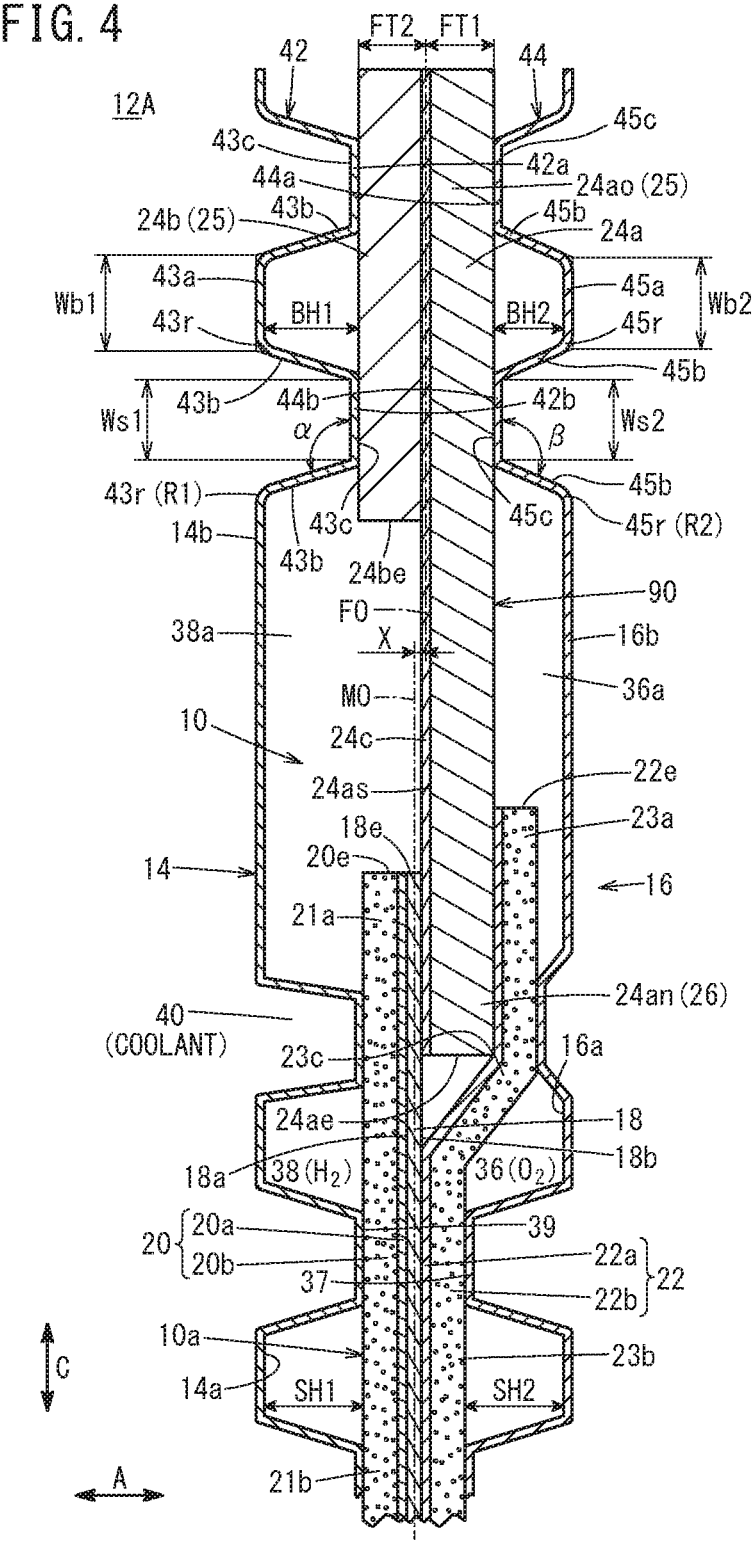
FIG. 4 is a cross sectional view showing main components of a power generation cell according to a second embodiment of the present invention.

Next, a power generation cell (fuel cell) 12A according to a second embodiment of the present invention will be described with reference to FIG. 4. In the following description, the structure of the power generation cell 12A that is identical to that of the power generation cell 12 according to the first embodiment, or the structure having the function that is identical to that of the power generation cell 12 according to the first embodiment are labeled with the same reference numerals, and description thereof will be omitted.

In this power generation cell 12A, a frame member inner peripheral portion 26 of a frame member 90 is joined between the electrolyte membrane 18 and the cathode 22. In this respect, the power generation cell 12A is different from the power generation cell 12 according to the first embodiment. In this case, the anode 20 can have a flat shape from the area 21b overlapped with the active area of the electrolyte membrane 18 to the area 21a overlapped with the inner peripheral portion 24an of the first frame shaped sheet 24a. It should be noted that the anode 20 may have an inclined area corresponding to an inclined area 23c of the cathode 22.

Further, the cathode 22 can have the inclined area 23c inclined from the electrolyte membrane 18, between the area 23b overlapped with the electrolyte membrane 18 and the area 23a overlapped with the inner peripheral portion 24an of the first frame shaped sheet 24a. Further, the surface size of the cathode 22 is larger than the surface size of the anode 20 (an outer end 22e of the cathode 22 is positioned outside an outer end 20e of the anode 20).

Further, the frame member 90 of the power generation cell 12A has structure where, in the frame member outer peripheral portion 25, the first frame shaped sheet 24a is positioned on a side closer to the second separator 16, and the second frame shaped sheet 24b is positioned on a side closer to the first separator 14. Further, the thickness FT1 of the outer peripheral portion 24ao of the first frame shaped sheet 24a of the frame member 90 and the thickness FT2 of the second frame shaped sheet 24b of the frame member 90 have the same size (FT1=FT2). In the structure, the central position FO of the frame member 90 in the thickness direction is positioned at the center of the adhesive layer 24c where the first frame shaped sheet 24a and the second frame shaped sheet 24b are adhered together. Further, the central position FO of the frame member 90 in the thickness direction is offset from the central position MO of the power generation area of the MEA 10a in the thickness direction.

Further, the first separator 14 and the second separator 16 of the power generation cell 12A has a first seal line 42 and a second seal line 44 having the same shapes as those of the first embodiment. That is, in the state where the first separator 14, the second separator 16, and the frame member outer peripheral portion 25 are stacked together, though the height BH2 of the beads 44a, 44b of the second seal line 44 is smaller than the height BH1 of the beads 42a, 42b of the first seal line 42, the elastic modulus of the first seal line 42 and the elastic modulus of the second seal line 44 are the same. Moreover, in the power generation cell 12A, the thickness FT1 of the first frame shaped sheet 24a and the thickness FT2 of the second frame shaped sheet 24b are the same.

Therefore, in the power generation cell 12A, at the time of sealing by the beads, the separators 14, 16 are pressed against, and tightly contact suitably, the first frame shaped sheet 24a and the second frame shaped sheet 24b. In the structure, the separators 14, 16 can apply the contact pressure at the same level to the anode 20 and the cathode 22 inside the bead seal portions over their surfaces. Thus, it is possible to suitably achieve uniform pressure in the stack structure suitably.

The present invention is not limited to the above first and second embodiments. It is a matter of course that various modifications can be made in line with the gist of the present invention. For example, also in the case where the first and second seal lines 42, 44 are made of elastic rubber material, the beads 42a, 42b and the beads 44a, 44b are joined to both surfaces of the frame equipped MEA 10 suitably. Thus, it is possible to stably form the stack structure of the MEA 10a and the first and second separators 14, 16, inside the first and second seal lines 42, 44.

In this case, the elastic modulus can be designed easily in each of the beads 42a, 42b of the first seal line 42 and each of the beads 44a, 44b of the second seal line 44, by adopting properties or cross sectional shapes that are different from each other, regarding the rubber materials thereof.

What is claimed is:

1. A fuel cell comprising: a membrane electrode assembly, the membrane electrode assembly including an electrolyte membrane, and a first electrode and a second electrode provided on both surfaces of the electrolyte membrane, respectively; a first separator stacked on the first electrode of the membrane electrode assembly; and a second separator stacked on the second electrode of the membrane electrode assembly, a first flow field being formed between the first separator and the first electrode, a first reactant gas being supplied to the first flow field, a second flow field being formed between the second separator and the second electrode, a second reactant gas being supplied to the second flow field, wherein a frame member is provided on an outer peripheral portion of the membrane electrode assembly, around the outer peripheral portion, the frame member includes a frame member inner peripheral portion joined to the membrane electrode assembly, and a frame member outer peripheral portion which is continuous with outside of the frame member inner peripheral portion and thicker than the frame member inner peripheral portion, and held between the first separator and the second separator, a central position of the membrane electrode assembly in a thickness direction and a central position of the frame member outer peripheral portion in a thickness direction are offset from each other, the first separator integrally includes a first seal expanding toward the frame member to seal the frame member outer peripheral portion and the second separator integrally includes a second seal expanding toward the frame member to seal the frame member outer peripheral portion, the first seal and the second seal are non-symmetrical with each other, and in a cross sectional side view, each of the first seal and the second seal includes a pair of inclined portions inclined from a flat bottom toward the frame member outer peripheral portion, and getting closer to each other, and a seal flat portion bridging the pair of inclined portions, and configured to seal the frame member outer peripheral portion.

2. The fuel cell according to claim 1, wherein the first seal and the second seal have different heights to the frame member outer peripheral portion, and an inclination angle of the pair of inclined portions inclined from the seal flat portion of the first or second seal having a smaller height is larger than an inclination angle of the pair of the inclined portions inclined from the seal flat portion of the first or second seal having a larger height.

3. The fuel cell according to claim 1, wherein the first seal and the second seal have different heights to the frame member outer peripheral portion, and a radius of curvature of a coupling portion between the inclined portion and the bottom of the first or second seal having the smaller height is larger than a radius of curvature of a coupling portion between the inclined portion and the bottom of the first or second seal having the larger height.

4. The fuel cell according to claim 1, wherein a width of the seal flat portion of the first seal and a width of the seal flat portion of the second seal are same.

5. The fuel cell according to claim 4, wherein a width of the bottom of the first seal and a width of the bottom of the second seal are same.

6. The fuel cell according to claim 1, wherein a height of the first flow field formed by the first separator, for the membrane electrode assembly, and a height of the second flow field formed by the second separator, for the membrane electrode assembly, are same.

7. The fuel cell according to claim 1, wherein an elastic modulus of the first seal and an elastic modulus of the second seal are same.

* * * * *